(12) United States Patent
Wilson

(10) Patent No.: US 10,619,721 B2
(45) Date of Patent: Apr. 14, 2020

(54) DRIVETRAIN ASSEMBLY FOR A WIND TURBINE

(71) Applicant: General Electric Company, Schenectady, NY (US)

(72) Inventor: Ian David Wilson, Simpsonville, SC (US)

(73) Assignee: General Electric Company, Shenectady, NY (US)

( * ) Notice: Subject to any disclaimer, the term of this patent is extended or adjusted under 35 U.S.C. 154(b) by 271 days.

(21) Appl. No.: 15/655,948

(22) Filed: Jul. 21, 2017

(65) Prior Publication Data

US 2019/0024776 A1    Jan. 24, 2019

(51) Int. Cl.
| | | |
|---|---|---|
| *F16H 57/02* | (2012.01) | |
| *F16H 57/028* | (2012.01) | |
| *F03D 80/70* | (2016.01) | |
| *F03D 15/00* | (2016.01) | |
| *F03D 80/80* | (2016.01) | |
| *F03D 1/06* | (2006.01) | |
| *F16H 57/08* | (2006.01) | |

(52) U.S. Cl.
CPC ............. *F16H 57/028* (2013.01); *F03D 1/06* (2013.01); *F03D 15/00* (2016.05); *F03D 80/70* (2016.05); *F03D 80/88* (2016.05); *F16H 57/08* (2013.01); *F05B 2240/50* (2013.01); *F05B 2240/60* (2013.01); *F05B 2260/40311* (2013.01); *F05B 2260/964* (2013.01); *F05B 2280/5001* (2013.01)

(58) Field of Classification Search
CPC ........ F16H 57/028; F16H 57/08; F03D 80/70; F03D 15/00; F03D 80/88; F03D 1/06; F05B 2240/50; F05B 2240/60; F05B 2260/40311; F05B 2260/964; F05B 2280/5001
See application file for complete search history.

(56) References Cited

U.S. PATENT DOCUMENTS

| | | | |
|---|---|---|---|
| 5,323,663 | A | 6/1994 | Ohgi et al. |
| 5,905,310 | A | 5/1999 | Nagao |
| 6,664,652 | B2 | 12/2003 | Chane-Waye |
| 7,281,442 | B2 | 10/2007 | Chane-Waye et al. |
| 7,871,084 | B2 | 1/2011 | Hakui et al. |
| 8,033,951 | B2 | 10/2011 | Pischel |

(Continued)

FOREIGN PATENT DOCUMENTS

| | | |
|---|---|---|
| EP | 2354544 A1 | 8/2011 |
| KR | 10-2014-0088513 A | 7/2014 |

OTHER PUBLICATIONS

International Search Report and Written Opinion issued in connection with corresponding PCT Application No. PCT/US2018/042806 dated Oct. 31, 2018.

*Primary Examiner* — Hung Q Nguyen
(74) *Attorney, Agent, or Firm* — Dority & Manning P.A.

(57) ABSTRACT

A drivetrain assembly for a wind turbine includes a main shaft, a bearing operatively coupled to an end of the main shaft, a bearing housing surrounding the bearing, and a gearbox having, at least, a ring gear. The ring gear is positioned adjacent to the bearing housing and includes an outer circumferential surface. The drivetrain assembly also includes at least one flexible member arranged at an interface between the bearing housing and the ring gear. As such, the flexible member(s) is configured to reduce vibrations generated by the gearbox.

20 Claims, 10 Drawing Sheets

(56) References Cited

U.S. PATENT DOCUMENTS

| | | | |
|---|---|---|---|
| 8,632,437 B2* | 1/2014 | Dinter | F03D 15/10 475/347 |
| 2004/0038770 A1* | 2/2004 | Flamang | F03D 1/00 475/348 |
| 2006/0160655 A1* | 7/2006 | Smook | F16H 1/2836 475/331 |
| 2008/0308980 A1 | 12/2008 | Mitsch | |
| 2010/0176601 A1 | 7/2010 | Pechlivanoglou et al. | |
| 2011/0094333 A1 | 4/2011 | Chane-Waye et al. | |
| 2011/0309628 A1 | 12/2011 | Corts | |
| 2012/0076652 A1 | 3/2012 | Ventzke et al. | |
| 2012/0099993 A1 | 4/2012 | Guerenbourg et al. | |
| 2013/0152581 A1 | 6/2013 | Lofgren | |
| 2013/0172141 A1 | 7/2013 | Dinter et al. | |
| 2013/0302144 A1 | 11/2013 | Demtroder et al. | |
| 2014/0037456 A1 | 2/2014 | Erno et al. | |
| 2014/0226926 A1 | 8/2014 | Caruso et al. | |
| 2014/0319764 A1 | 10/2014 | Saito | |
| 2015/0367880 A1 | 12/2015 | Chae et al. | |
| 2016/0061191 A1 | 3/2016 | Wilson | |

* cited by examiner

DRIVETRAIN ASSEMBLY FOR A WIND TURBINE

FIELD

The present disclosure relates in general to wind turbines, and more particularly to a drivetrain assembly for a wind turbine having reduced gearbox-generated vibrations.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate located within the nacelle. More specifically, in many wind turbines, the gearbox is mounted to the bedplate via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

More specifically, the majority of commercially available wind turbines utilize multi-stage geared drivetrains to connect the turbine blades to electrical generators. The wind turns the turbine blades, which spin a low speed shaft. The low speed shaft is coupled to an input shaft of a gearbox, which has a higher speed output shaft connected to a generator. Thus, the geared drivetrain aims to increase the velocity of the mechanical motion from the wind.

For example, as shown in FIG. 1, a perspective view of a conventional drivetrain 30 is illustrated. As shown, the drivetrain 30 includes a conventional gearbox 32 having include one or more gears and/or gear trains (not shown) to provide speed and/or torque conversions from the rotor to the generator 24. For example, a typical gearbox may include a gear system having one or more outer planet gears revolving about a central or sun gear. The planet gears are typically mounted on a movable arm or carrier which itself may rotate relative to the sun gear. Further, as shown, the gearbox 32 typically also includes a ring gear 34 configured to mesh with the planet gears.

Over time, normal operating loads and forces from the wind act on the wind turbine components described above and can subject the components to various vibrations, deformations, and/or distortions. Thus, the drivetrain 30 of a modern wind turbine is typically mounted to the bedplate 36 with one or more elastic components configured therebetween so as to absorb various forces and vibrations acting on the wind turbine in an effort to prevent damage. For example, as shown in in FIG. 1, the conventional drivetrain 30 typically includes one or more elastic components 33 (e.g. at interface 35) configured between the torque arm 38 of the gearbox 32 and the bedplate 36.

However, conventional wind turbines require very high torque loads to be transferred from the ring gear 34 into the bearing housing 37 before then passing through the bearing housing 37 through the elastic components 33 at interface 35 into the bedplate 36. As such, a bolted joint 39 between the ring gear 34 and bearing housing 37 is highly loaded. In addition, for some modern wind turbines, more compact gearboxes are being utilized to control the costs and weight of larger megawatt wind turbines. These compact gearboxes transmit torque through bolted flanges having shear pins. However, the higher torque-loaded flanges for the same diameter are causing the traditional torque transmission technology to reach its functional limits. Further, the joint 39 between the ring gear 31 and bearing housing 37 for compact gearboxes is more difficult to design than conventional gearboxes.

Thus, improved systems and methods that eliminate the bolted joint 39 between the ring gear 34 and bearing housing 37 so as to pass torque loads directly to a plurality elastomer pins would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a drivetrain assembly for a wind turbine. The drivetrain assembly includes a main shaft, a bearing operatively coupled to an end of the main shaft, a bearing housing surrounding the bearing, and a gearbox having, at least, a ring gear. The ring gear is positioned adjacent to the bearing housing and includes an outer circumferential surface. The drivetrain assembly also includes at least one flexible member arranged at an interface between the bearing housing and the ring gear. As such, the flexible member(s) is configured to reduce vibrations generated by the gearbox.

In one embodiment, the drivetrain assembly may include a plurality of flexible members arranged on the outer circumferential surface of the ring gear at the interface. In such embodiments, each of the flexible members may be arranged in a notch formed into the bearing housing.

In further embodiments, the drivetrain assembly may also include at least one compression member arranged on the outer circumferential surface of the ring gear on an opposing side of the flexible members from the bearing housing. As such, the compression member(s) can be secured to the bearing housing so as to compress the plurality of flexible members. In certain embodiments, the compression member(s) may include a plurality of corresponding notches that align with the notches of the bearing housing. In another embodiment, the compression member(s) may be secured to the bearing housing via a predetermined number of fasteners. In such embodiments, the predetermined number of fasteners may be determined as a function of torque acting through the bearing housing. In certain embodiments, the compression member(s) may be a single part or may include a plurality of compression member segments.

In additional embodiments, the drivetrain assembly may further include at least one radially-extending pin extending through each of the plurality of flexible members and into the outer circumferential surface of the ring gear so as to secure each of the plurality of flexible members to the ring gear at the interface. More specifically, in one embodiment, the drivetrain assembly may include at least two radially-extending pins extending through each of the plurality of flexible members.

In several embodiments, the flexible members as described herein may be constructed, at least in part, of an elastomeric material. More specifically, in one embodiment, the flexible member may be further constructed, at least in part, of the elastomeric material and a metal material. In such embodiments, the elastomeric material may at least partially surround the metal material and radially-extending pins may extend through the metal material.

In yet another embodiment, the flexible member(s) may have any suitable cross-sectional shape, including but not limited to circle, oblong, oval, rectangle, square, diamond, triangle, or U-shaped.

In another aspect, the present disclosure is directed to a method for assembling a drivetrain assembly of a wind turbine so as to reduce vibrations thereof. The drivetrain assembly has a main shaft, a bearing operatively coupled to main shaft, a bearing housing surrounding the bearing, and a gearbox having a ring gear positioned adjacent to the bearing housing. As such, the method includes forming a plurality of notches into a circumferential edge of the bearing housing. Further, the method includes placing a flexible member into each of the plurality of notches atop an outer circumferential surface of the ring gear. Moreover, the method includes securing each of the flexible members to the outer circumferential surface of the ring gear. In addition, the method includes compressing the flexible members against the bearing housing. As such, during operation of the drivetrain assembly, the torque reacts from the ring gear to the flexible members.

In one embodiment, the step of compressing the flexible members against the bearing housing may include positioning at least one compression member onto the outer circumferential surface of the ring gear on an opposing side of the flexible members from the bearing housing and securing the compression member(s) to the bearing housing between the notches so as to compress the plurality of flexible members.

In another embodiment, the method may include forming a plurality of corresponding notches into the at least one compression member, aligning the corresponding notches of the at least one compression member with the notches of the bearing housing, and placing the flexible members into the aligned notches atop an outer circumferential surface of the ring gear.

In further embodiments, the method may include determining a number of fasteners needed for securing the compression member(s) to the bearing housing as a function of a torque acting through the bearing housing and securing the compression member(s) to the bearing housing via the determined number of fasteners.

In several embodiments, the method may also include securing each of the flexible members to the outer circumferential surface of the ring gear via at least one radially-extending pin extending through each of the flexible members.

In additional embodiments, the method may include forming the flexible members, at least in part, of an elastomeric material. More specifically, in one embodiment, the method may include forming the flexible members, at least in part, of the elastomeric material and a metal material. In such embodiments, as mentioned, the elastomeric material may at least partially surround the metal material and the radially-extending pin(s) may extend through the metal material.

In yet another aspect, the present disclosure is directed to a wind turbine. The wind turbine includes a tower, a nacelle mounted atop the tower, a rotor mounted to the nacelle and having a rotatable hub and at least one rotor blade mounted thereto, a bedplate arranged within the nacelle, and a drivetrain assembly supported by the bedplate. The drivetrain assembly includes a main shaft, a bearing operatively coupled to an end of the main shaft, a bearing housing surrounding the bearing, and a gearbox having, at least, a ring gear. The ring gear is positioned adjacent to the bearing housing and includes an outer circumferential surface. The drivetrain assembly also includes at least one flexible member arranged at an interface between the bearing housing and the ring gear. As such, the flexible member(s) is configured to reduce vibrations generated by the gearbox. It should be understood that the wind turbine may further include any one of or combination of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
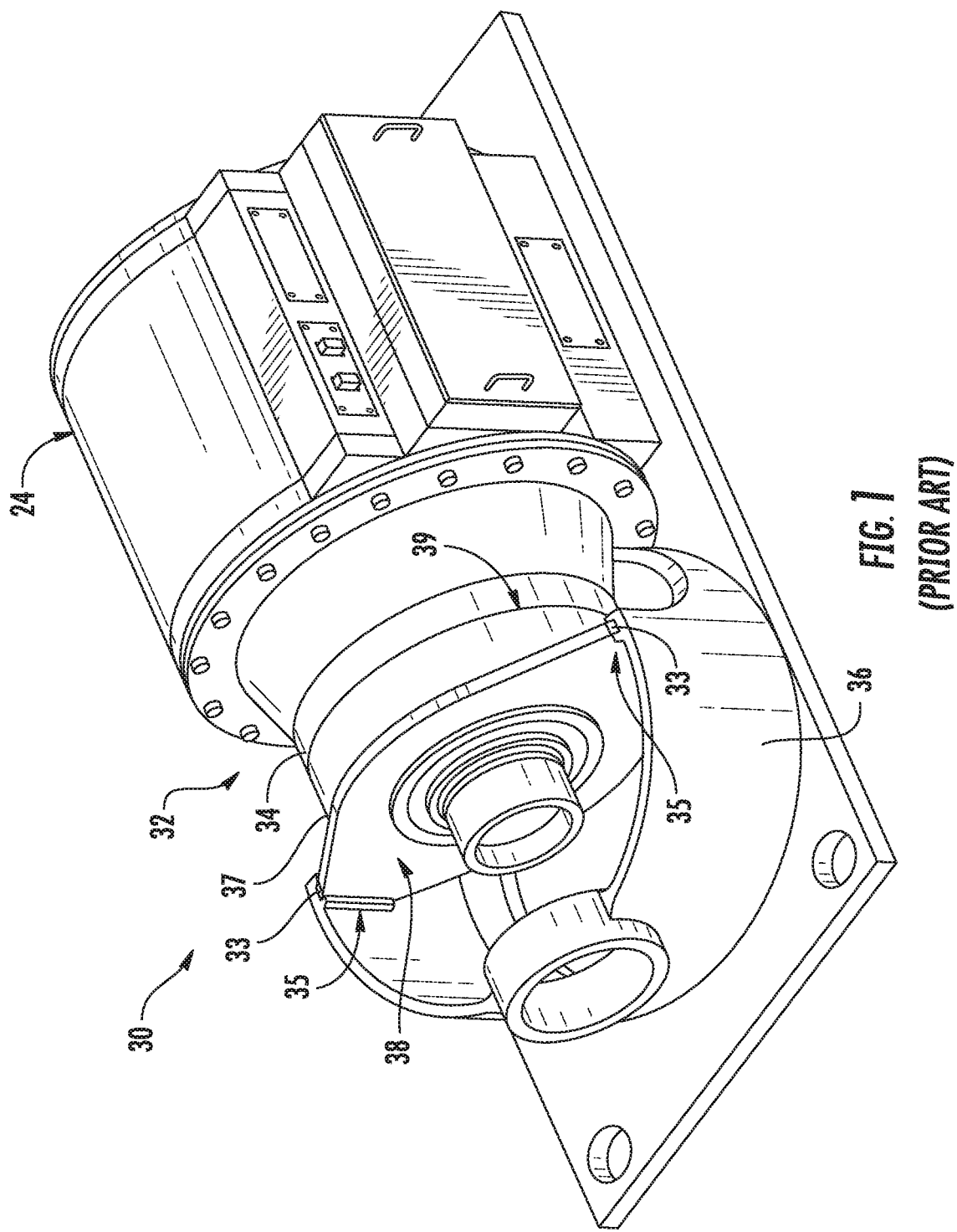
FIG. 1 illustrates a perspective view of a drivetrain assembly according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
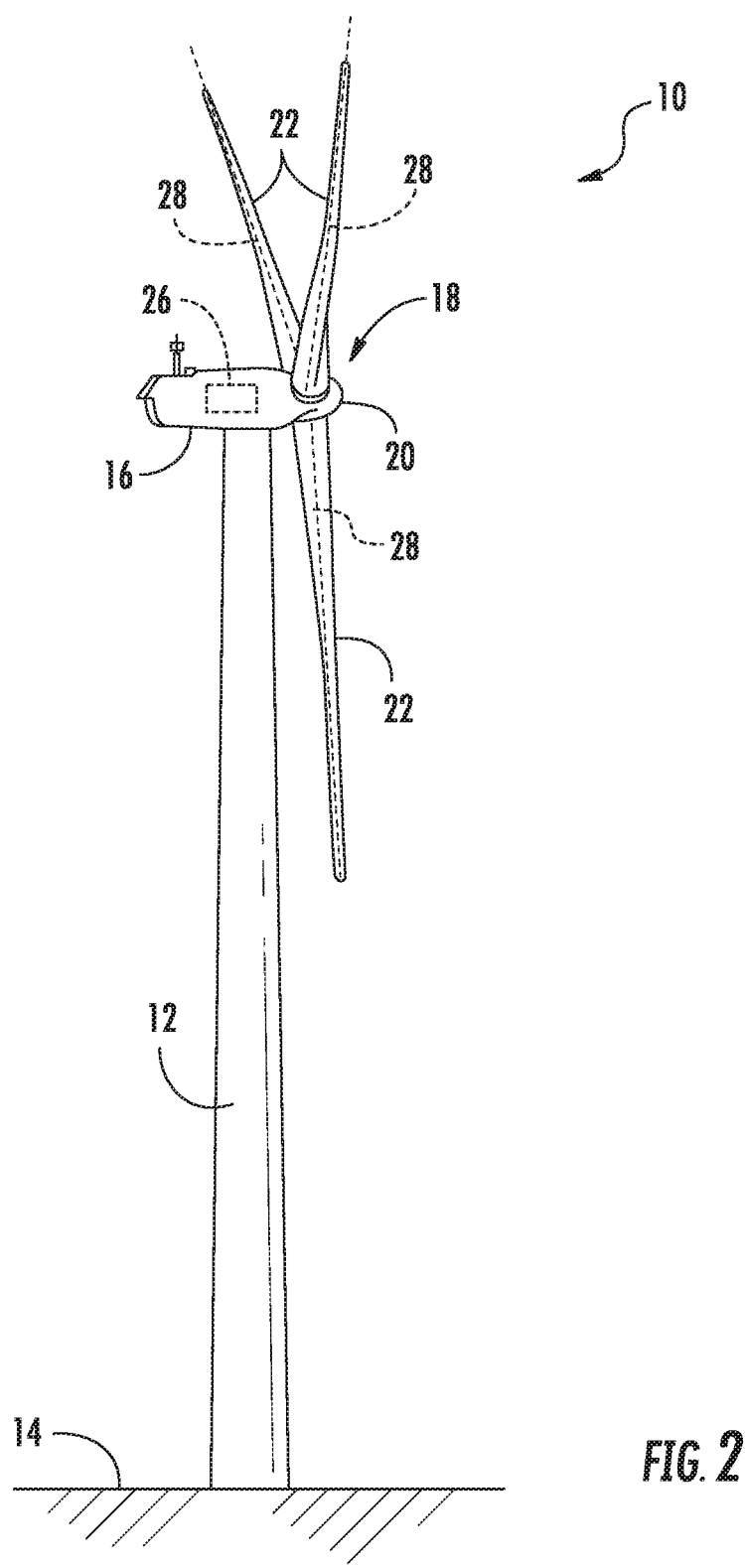
FIG. 2 illustrates a perspective view of a wind turbine according to one embodiment of the present disclosure.

Referring to the drawings, FIG. 2 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 3:
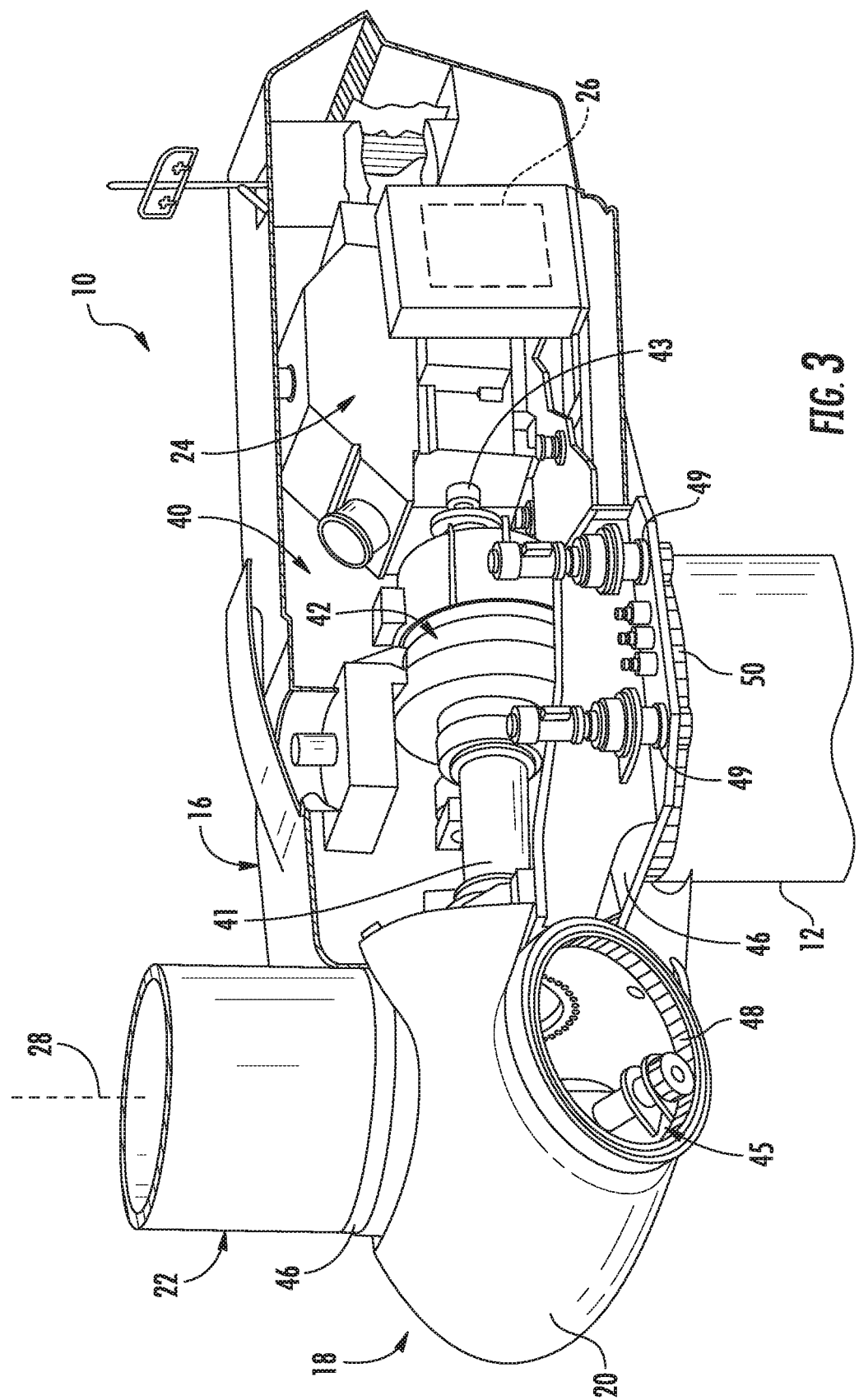
FIG. 3 illustrates a perspective view of a simplified, internal view of one embodiment of a nacelle of a wind turbine according to the present disclosure.

Referring now to FIG. 3, a simplified, internal view of one embodiment of the nacelle 16 of the wind turbine 10 shown in FIG. 1 is illustrated. As shown, a drivetrain assembly 40 according to the present disclosure is illustrated. The drivetrain assembly 40 includes the generator 24 coupled to the rotor 18 for producing electrical power from the rotational energy generated by the rotor 18. Further, as shown in the illustrated embodiment, the rotor 18 may include a rotor shaft 41 coupled to the hub 20 for rotation therewith. The rotor shaft 41 may, in turn, be rotatably coupled to a generator shaft 43 of the generator 24 through a gearbox 42 supported on a bedplate 46. As is generally understood, the rotor shaft 41 may provide a low speed, high torque input to the gearbox 42 in response to rotation of the rotor blades 22 and the hub 20. The gearbox 42 may then be configured to convert the low speed, high torque input to a high speed, low torque output to drive the generator shaft 43 and, thus, the generator 24.

Each rotor blade 22 may also include a pitch adjustment mechanism 45 configured to rotate each rotor blade 22 about its pitch axis 28 via a pitch bearing 48. Similarly, the wind turbine 10 may include one or more yaw drive mechanisms 49 communicatively coupled to the controller 26, with each yaw drive mechanism(s) 49 being configured to change the angle of the nacelle 16 relative to the wind (e.g., by engaging a yaw bearing 50 of the wind turbine 10).

Figure 4:
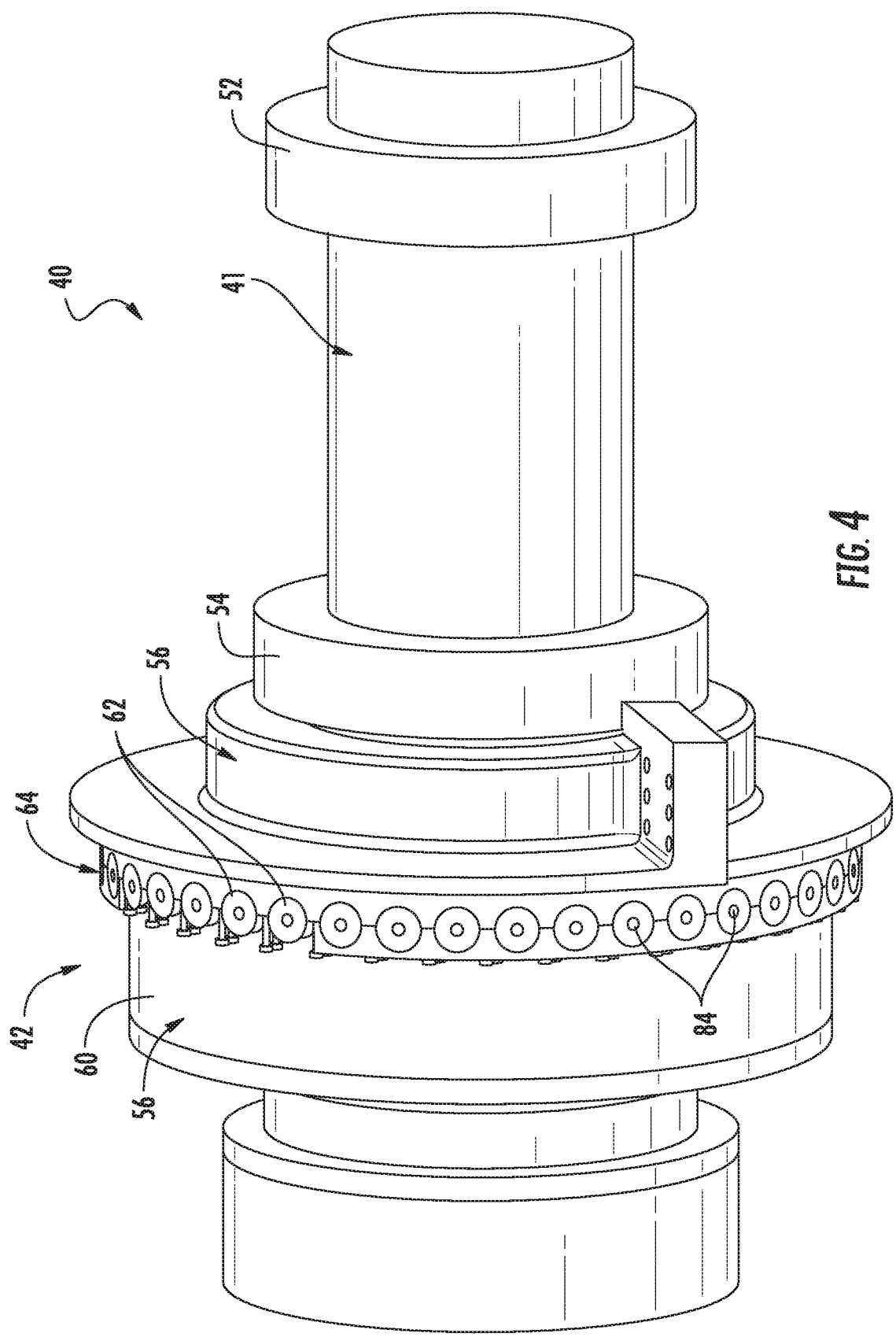
FIG. 4 illustrates a perspective view of one embodiment of a drivetrain assembly according to the present disclosure.

Referring now to FIG. 4, a perspective view of part of the drivetrain assembly 40 in accordance with an embodiment of the present invention is illustrated. It should be understood that the drivetrain assembly 40 may be supported atop the bedplate 48 (FIG. 3), which is in turn mounted on the nacelle 16 (shown in FIG. 2). Further, as shown, the drivetrain assembly 40 includes, at least, the main shaft 41, one or more bearings 52, 54 operatively coupled to opposing ends of the main shaft 41, a bearing housing 56 surrounding one of the bearings 52, 54, and the gearbox 42. The drivetrain assembly 40 also generally includes the generator 24 (FIG. 3).

Figure 5:
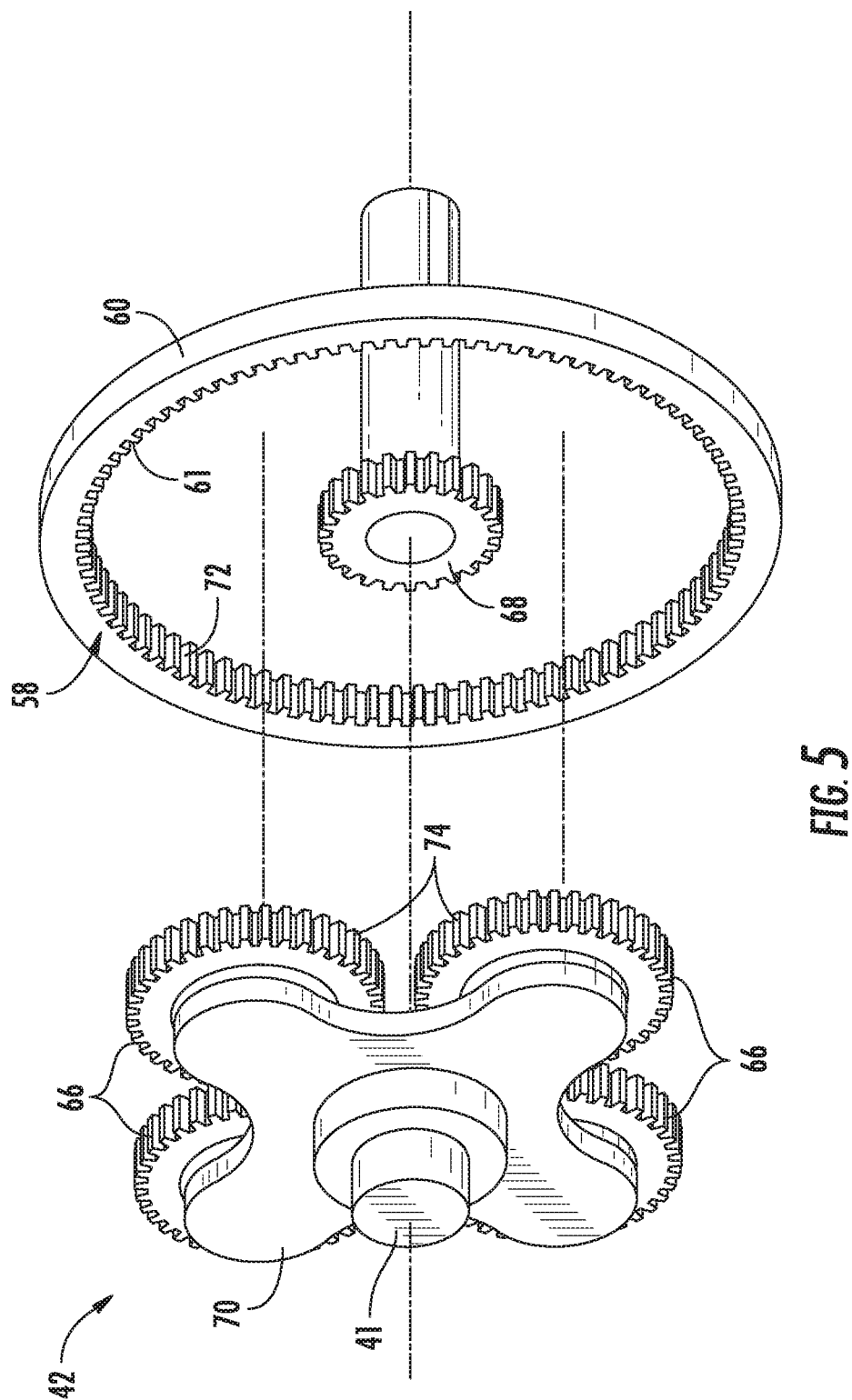
FIG. 5 illustrates a perspective view of one embodiment of a gear system particularly illustrating a ring gear according to the present disclosure.

As shown in FIG. 5, the gearbox 42 may be any suitable gear assembly that uses one or more gears and/or gear trains to provide speed and/or torque conversions from the rotor shaft 41 to the generator 24. For example, as shown, the gearbox 42 may include a gear system having one or more outer or planet gears 66 revolving about a central or sun gear 68. In addition, the planet gears 66 are typically mounted on a movable arm or carrier 70 which itself may rotate relative to the sun gear 68. The gearbox 42 may also include at least one outer ring gear 58 configured to mesh the planet gears 66. Thus, as shown, the ring gear 58 may generally include outer and inner circumferential surfaces 60, 61 and a set of gear teeth 72 on the inner circumferential surface 61 that are configured to mesh with corresponding teeth 74 of the planet gears 66. Further, as shown particularly in FIG. 4, the ring gear 58 is positioned adjacent to the bearing housing 56.

Referring now to FIGS. 4 and 6-12, various detailed views of the drivetrain assembly 40 of the present disclosure are illustrated. More specifically, as shown, the drivetrain assembly 40 may also include at least one flexible member 62 arranged at an interface 64 between the bearing housing 56 and the ring gear 58. For example, as shown in to FIGS. 4, 6, and 8-12, the drivetrain assembly 40 may include a plurality of flexible members 62 arranged on the outer circumferential surface 60 of the ring gear 58 at the interface 64. Thus, the drivetrain assembly 40 replaces the bolted joint 39 between the conventional ring gear 34 and the conventional bearing housing 37 of FIG. 1 with a flexible interface 64 that directs torque loads directly to the flexible member(s) 62 instead of shear pins. As such, the flexible member(s) 62 is also configured to reduce vibrations generated 42 by the gearbox.

Figure 6:
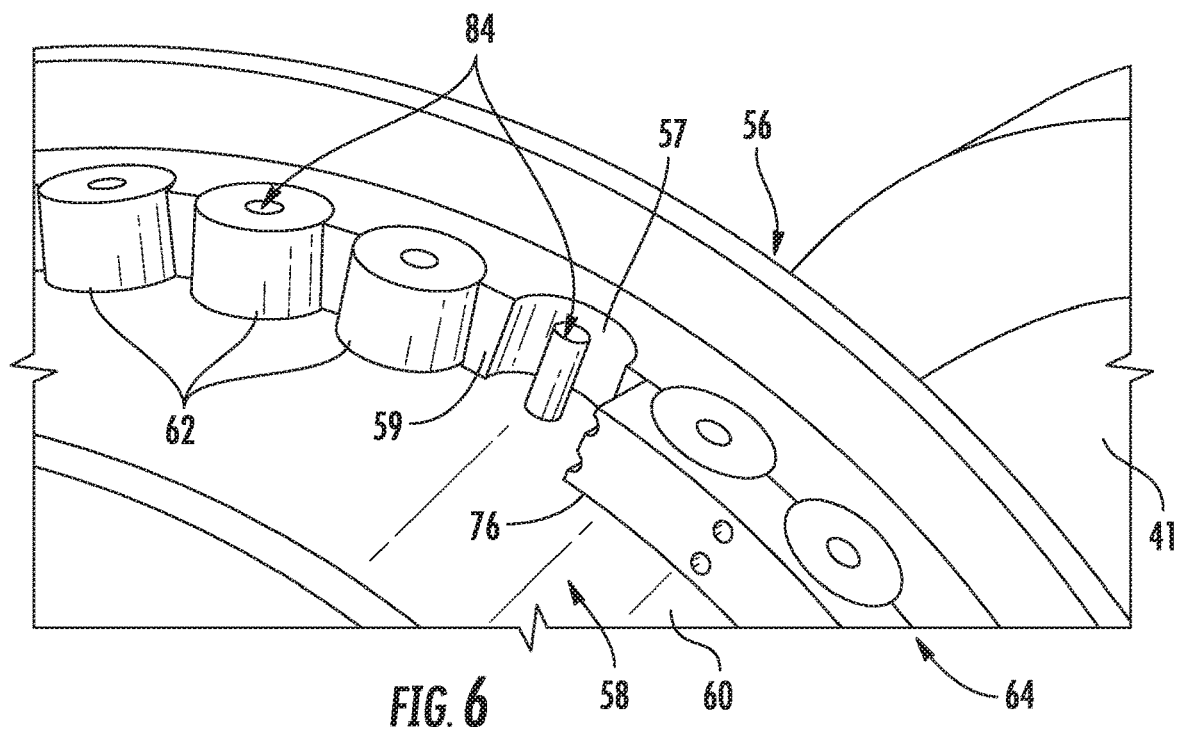
FIG. 6 illustrates a partial, perspective view of one embodiment of the drivetrain assembly according to the present disclosure, particularly illustrating flexible members arranged at an interface of the bearing housing and the ring gear.

Referring particularly to FIG. 6, each of the flexible members 62 may be arranged in a notch 57 formed into a circumferential edge 59 of the bearing housing 56. For example, as shown, the notches 57 of the bearing housing 56 have a profile that generally corresponds to the shape of the individual flexile members 62. As such, each of the notches 57 is configured to receive one of the flexible members 62.

Figure 10:
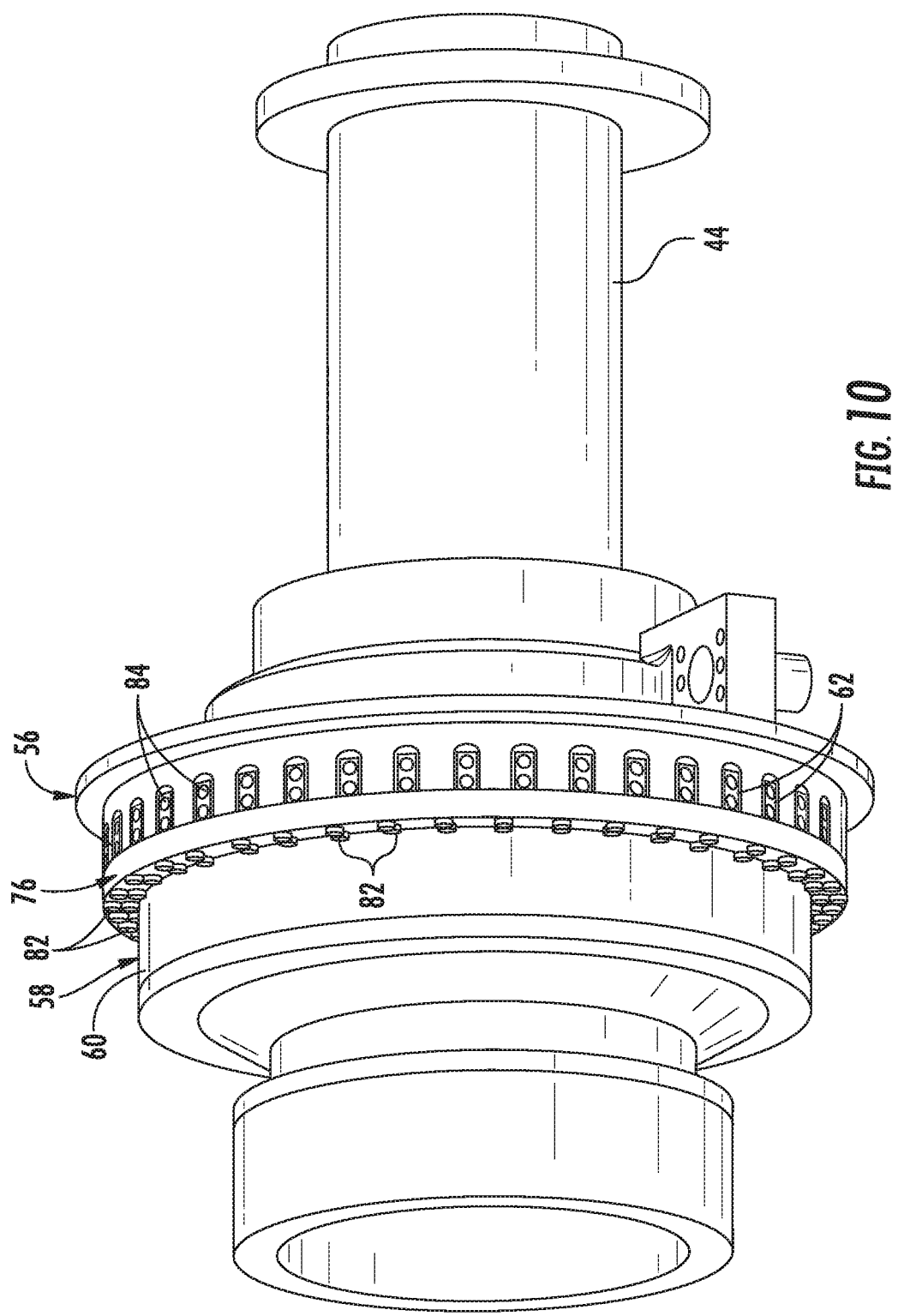
FIG. 10 illustrates a perspective view of another embodiment of a drivetrain assembly according to the present disclosure.
Figure 11:
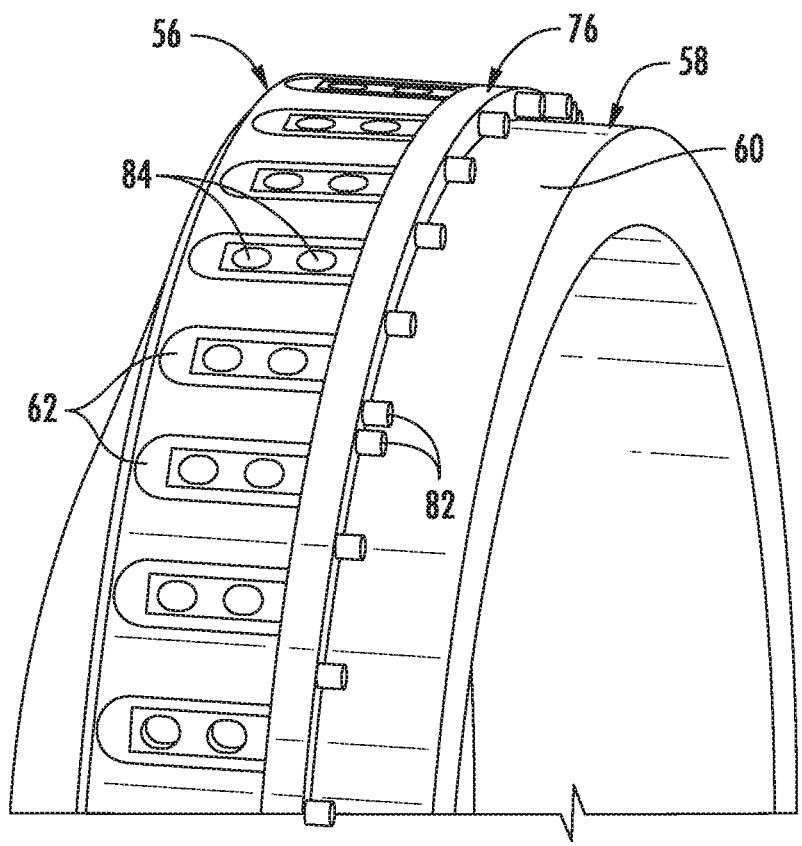
FIG. 11 illustrates a partial, perspective view of another embodiment of a drivetrain assembly according to the present disclosure, particularly illustrating flexible members thereof formed from at least two different materials.

In addition, as shown in FIGS. 4 and 6-11, the drivetrain assembly 40 may further include at least one radially-extending pin 84 extending through each of the flexible members 62 and into the outer circumferential surface 60 of the ring gear 58 so as to secure each of the flexible members 62 to the ring gear 58 at the interface 64. More specifically, as shown particularly in FIG. 7, each of the radially-extending pins 84 may be threaded into a bore hole 86 on the outer circumferential surface 60 of the ring gear 58. Alternatively, the radially-extending pins 84 may be secured into the bore holes 86 using any suitable means, such as via an adhesive. Further, as shown in FIGS. 4 and 6-9, a single radially-extending pin 84 may extend through each of the flexible members 62. Alternatively, as shown in FIGS. 10-11, at least two radially-extending pins 84 may extend through each of the flexible members 62. In further embodiments, it should be understood that any number of pins 84 may be used to secure each of the flexible members 62 in place.

Referring specifically to FIGS. 4 and 6-11, the drivetrain assembly 40 may also include at least one compression member 76 arranged on the outer circumferential surface 60 of the ring gear 58 on an opposing side of the flexible members 62 from the bearing housing 56. As such, when the compression member(s) 76 is secured to the bearing housing 56, the flexible members 62 are compressed between the compression member(s) 76 and the bearing housing 56. In one embodiment, as shown in FIG. 10, the compression member(s) 76 may be a single part. Alternatively, as shown in FIGS. 4, 7, 8, and 11, the compression member(s) 76 may include a plurality of compression member segments 78 arranged together to form a ring.

Figure 7:
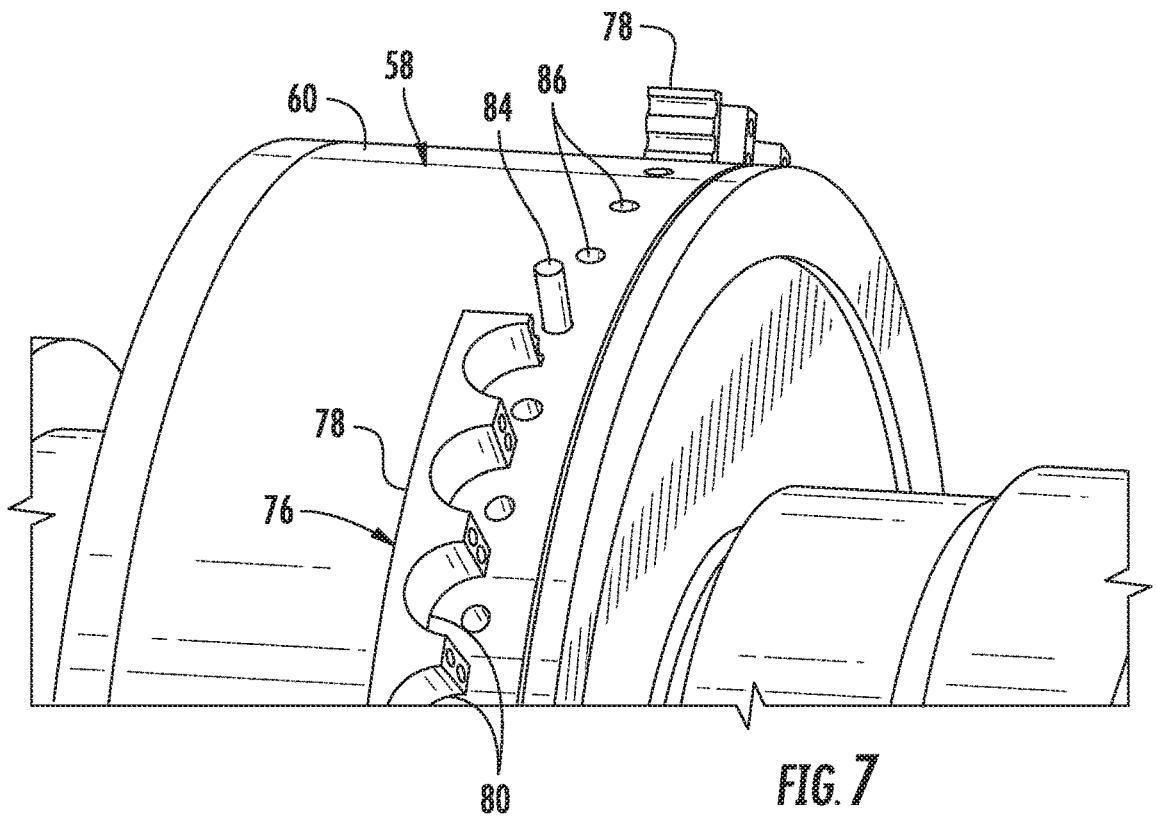
FIG. 7 illustrates a partial, perspective view of one embodiment of the drivetrain assembly with the bearing housing removed according to the present disclosure, particularly illustrating compression member segments having notches configured to receive flexible members arranged on an outer circumferential surface of the ring gear.

In addition, as shown particularly in FIG. 7, the compression member(s) 76 may include a plurality of corresponding notches 80. Thus, as shown in the illustrated embodiment of FIGS. 6 and 8, the corresponding notches 80 of the compression member(s) 76 align with the notches 57 of the bearing housing 56. Alternatively, as shown in FIGS. 10 and 11, the compression member(s) 76 may be absent of notches 80. Thus, as shown, the compression member(s) 76 is configured to abut against the bearing housing 56 adjacent to the notches 57 thereof 56.

Figure 8:
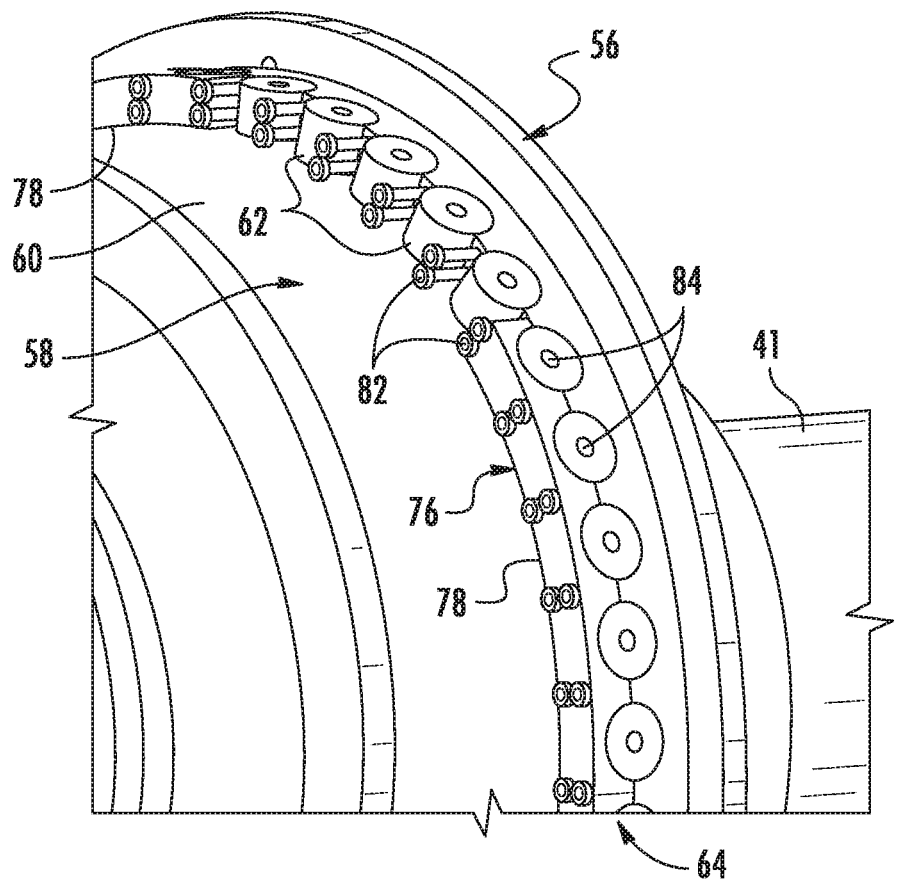
FIG. 8 illustrates a partial, perspective view of another embodiment of the drivetrain assembly according to the present disclosure, particularly illustrating flexible members arranged at an interface of the bearing housing and the ring gear.
Figure 9:
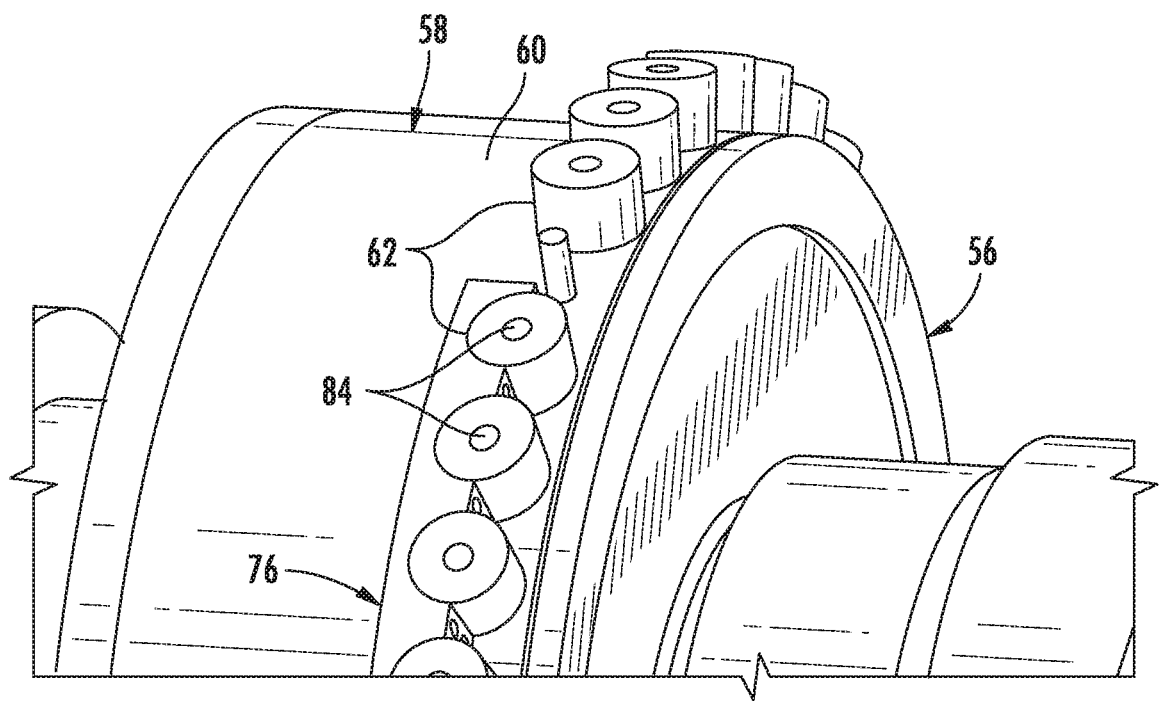
FIG. 9 illustrates a partial, perspective view of another embodiment of the drivetrain assembly with the bearing housing removed according to the present disclosure, particularly illustrating flexible members arranged on an outer circumferential surface of the ring gear.

Referring particularly FIGS. 8, 10, 11, the compression member(s) 76 may be secured to the bearing housing 56 via a predetermined number of fasteners 82. In certain embodiments, the number of fasteners 82 may be determined as a function of torque acting through the bearing housing 56. In addition, as shown in the illustrated embodiment, the fasteners 82 may be secured though the compression member(s) 76 and the bearing housing 56 between each of the notches 57 thereof so as to compress the flexible members 62. It should be understood, however, that any number and/or arrangement of fasteners 82 may be used to provide the desired compression of the flexible members 62.

The flexible members 62 as described herein may be constructed of any suitable flexible material. For example, in one embodiment, the flexible members 62 may be constructed of an elastomeric material 88. In another embodiment, the flexible members 62 as described herein may be constructed of different elastic materials. In particular embodiment, the flexible members 62 may be constructed of different materials, such as an elastomeric material 88 and a metal material 90. In certain embodiments, the elastomeric material 88 may be any suitable elastomer, including a thermoplastic material (such as an acrylic-styrene-acrylonitrile (ASA) polymer material), a thermoset elastomer, silicone, or rubber, or combinations thereof. In further embodiments, the metal material 90 may include steel, aluminum, brass, nickel, titanium, or any other suitable metal, or combinations thereof. In this manner, the varying-material flexible members 72 are configured to achieve desired properties for both fatigue and extreme loading of the drivetrain assembly 40.

Figure 12:
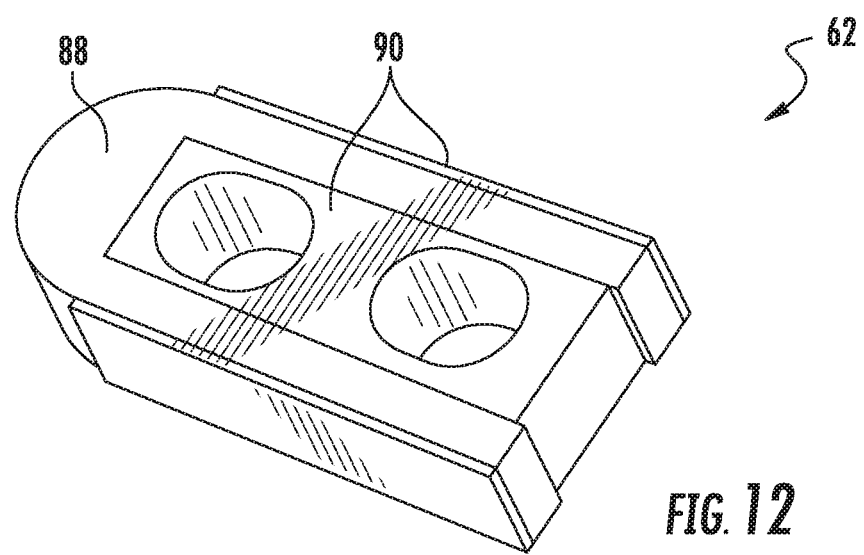
FIG. 12 illustrates a perspective view of one embodiment of the flexible member of the drivetrain assembly according to the present disclosure.

It should also be understood that the flexible member(s) 62 of the present disclosure may have any suitable cross-sectional shape, including but not limited to circle, oblong, oval, rectangle, square, diamond, triangle, or U-shaped. For example, as shown in FIGS. 4, 6, 8, and 9, the flexible members 62 have a generally circular shape. Alternatively, as shown in FIG. 10, the flexible members 62 have a generally rectangular shape. In still further embodiments, as shown in FIGS. 11 and 12, the flexible members 62 have a generally oblong/U-shape formed of at least two different materials. More particularly, as shown in FIG. 12, the illustrated flexible member 62 includes an elastomeric material 88 at least partially surrounding an internal metal material 90 with additional metal material 90 arranged on opposing sides of the elastomeric material 88. In such embodiments, as shown in FIG. 11, the radially-extending pin(s) 84 as described herein may extend through the internal metal material 90, i.e. to provide a stronger connection. In addition, the side metal material engages the notches 57 of the bearing housing 56.

Figure 13:
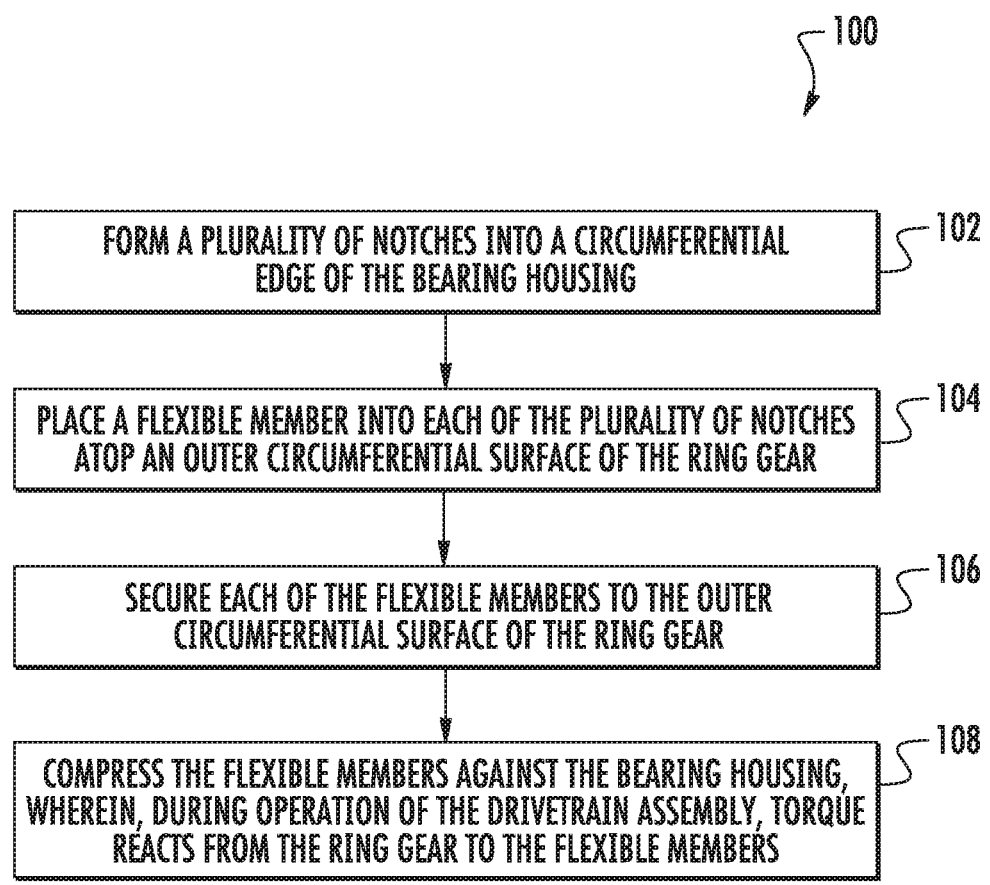
FIG. 13 illustrates a flow diagram of one embodiment of a method for assembling a drivetrain assembly of a wind turbine so as to reduce vibrations thereof according to the present disclosure.

Referring now to FIG. 13, a flow diagram of one embodiment of a method 100 for assembling the drivetrain assembly 40 of the wind turbine 10 according to the present disclosure so as to reduce vibrations thereof is illustrated. As shown at 102, the method 100 includes forming a plurality of notches into a circumferential edge of the bearing housing 56. As shown at 104, the method 100 includes placing a flexible member into each of the plurality of notches atop an outer circumferential surface of the ring gear. As shown at 106, the method 100 includes securing each of the flexible members to the outer circumferential surface 50 of the ring gear 58. As shown at 108, the method 100 includes compressing the flexible members 62 against the bearing housing 56. For example, in one embodiment, the flexible members 62 may be compressed against the bearing housing 56 by positioning the compression member(s) 76 onto the outer circumferential surface 60 of the ring gear 58 on an opposing side of the flexible members 72 from the bearing housing 56 and securing the compression member(s) 76 to the bearing housing 56 between the notches 80 so as to compress the flexible members 62. As such, during operation of the drivetrain assembly 40, the torque reacts from the ring gear 58 to the flexible members 62.

In another embodiment, the method 100 may include forming a plurality of corresponding notches 80 into the compression member(s) 76, aligning the corresponding notches 80 of the compression member(s) 76 with the notches 57 of the bearing housing 56, and placing the flexible members 62 into the aligned notches 57, 80 atop the outer circumferential surface 50 of the ring gear 58.

In further embodiments, the method 100 may include determining a number of fasteners 82 needed for securing the compression member(s) 76 to the bearing housing 56 as a function of a torque acting through the bearing housing 56 and securing the compression member(s) 76 to the bearing housing 56 via the determined number of fasteners 82. In several embodiments, the method 100 may also include securing each of the flexible members 62 to the outer circumferential surface 60 of the ring gear 58 via at least one radially-extending pin 84 extending through each of the flexible members 62.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drivetrain assembly for a wind turbine, the assembly comprising:
    a main shaft;
    a bearing operatively coupled to an end of the main shaft;
    a bearing housing surrounding the bearing;
    a gearbox comprising, at least, a ring gear, the ring gear positioned adjacent to the bearing housing, the ring gear comprising an outer circumferential surface; and,
    at least one flexible member arranged at an interface between the bearing housing and the ring gear, the at least one flexible member configured to reduce vibrations generated by the gearbox.

2. The drivetrain assembly of claim 1, further comprising a plurality of flexible members arranged on the outer circumferential surface of the ring gear at the interface.

3. The drivetrain assembly of claim 2, wherein each of the plurality of flexible members is arranged in a notch formed into the bearing housing.

4. The drivetrain assembly of claim 2, further comprising at least one compression member arranged on the outer circumferential surface of the ring gear on an opposing side of the plurality of flexible members from the bearing housing, the at least one compression member secured to the bearing housing so as to compress the plurality of flexible members.

5. The drivetrain assembly of claim 4, wherein the least one compression member comprises a plurality of corresponding notches, the corresponding notches configured to align with the notches of the bearing housing.

6. The drivetrain assembly of claim 4, wherein the least one compression member is secured to the bearing housing via a predetermined number of fasteners, the predetermined number of fasteners being determined as a function of torque acting through the bearing housing.

7. The drivetrain assembly of claim 4, wherein the least one compression member comprises a plurality of compression member segments.

8. The drivetrain assembly of claim 2, further comprising at least one radially-extending pin extending through each of the plurality of flexible members and into the outer circumferential surface of the ring gear so as to secure each of the plurality of flexible members to the ring gear at the interface.

9. The drivetrain assembly of claim 8, further comprising at least two radially-extending pins extending through each of the plurality of flexible members.

10. The drivetrain assembly of claim 9, wherein the plurality of flexible member are constructed, at least in part, of an elastomeric material.

11. The drivetrain assembly of claim 10, wherein the plurality of flexible member are further constructed, at least in part, of the elastomeric material and a metal material, the elastomeric material at least partially surrounding the metal material, wherein the radially-extending pins extend through the metal material.

12. The drivetrain assembly of claim 1, wherein the at least one flexible member comprises any one of the following cross-sectional shapes: circle, oblong, oval, rectangle, square, diamond, triangle, or U-shaped.

13. A method for assembling a drivetrain assembly of a wind turbine so as to reduce vibrations thereof, the drivetrain assembly having a main shaft, a bearing operatively coupled to main shaft, a bearing housing surrounding the bearing, and a gearbox having a ring gear positioned adjacent to the bearing housing, the method comprising:
    forming a plurality of notches into a circumferential edge of the bearing housing;
    placing a flexible member into each of the plurality of notches atop an outer circumferential surface of the ring gear;
    securing each of the flexible members to the outer circumferential surface of the ring gear; and,
    compressing the flexible members against the bearing housing,
    wherein, during operation of the drivetrain assembly, torque reacts from the ring gear to the flexible members.

14. The method of claim 13, wherein compressing the flexible members against the bearing housing further comprises:
    positioning at least one compression member onto the outer circumferential surface of the ring gear on an opposing side of the flexible members from the bearing housing; and,
    securing the at least one compression member to the bearing housing between the notches so as to compress the plurality of flexible members.

15. The method of claim 14, further comprising:
    forming a plurality of corresponding notches into the at least one compression member;
    aligning the corresponding notches of the at least one compression member with the notches of the bearing housing; and,
    placing the flexible members into the aligned notches atop an outer circumferential surface of the ring gear.

16. The method of claim 14, further comprising:
    determining a number of fasteners needed for securing the at least one compression member to the bearing housing as a function of torque acting through the bearing housing; and,
    securing the least one compression member to the bearing housing via the determined number of fasteners.

17. The method of claim 13, further comprising securing each of the flexible members to the outer circumferential surface of the ring gear via at least one radially-extending pin extending through each of the flexible members.

18. The method of claim 17, further comprising forming the flexible members, at least in part, of an elastomeric material.

19. The method of claim 18, further comprising forming the flexible members, at least in part, of the elastomeric material and a metal material, the elastomeric material at least partially surrounding the metal material, wherein the at least one radially-extending pin extends through the metal material.

20. A wind turbine, comprising:
   a tower;
   a nacelle mounted atop the tower;
   a rotor mounted to the nacelle, the rotor comprising a rotatable hub and at least one rotor blade mounted thereto;
   a bedplate arranged within the nacelle;
   a drivetrain assembly supported by the bedplate, the drivetrain assembly comprising:
   a main shaft operatively coupled to the rotor;
   a bearing operatively coupled to an end of the main shaft opposite the rotor;
   a bearing housing surrounding the bearing;
   a gearbox comprising, at least, a ring gear, the ring gear positioned adjacent to the bearing housing at an interface; and,
   at least one flexible member arranged at the interface, the at least one flexible member configured to reduce vibrations generated by the gearbox.

* * * * *